Sept. 7, 1954  V. W. BALZER  2,688,170
STRAP CLAMP
Filed March 31, 1951
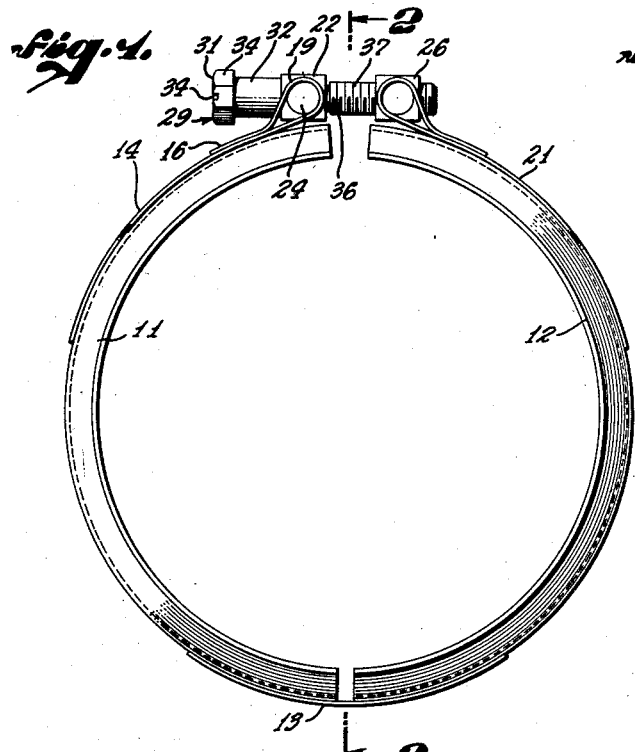
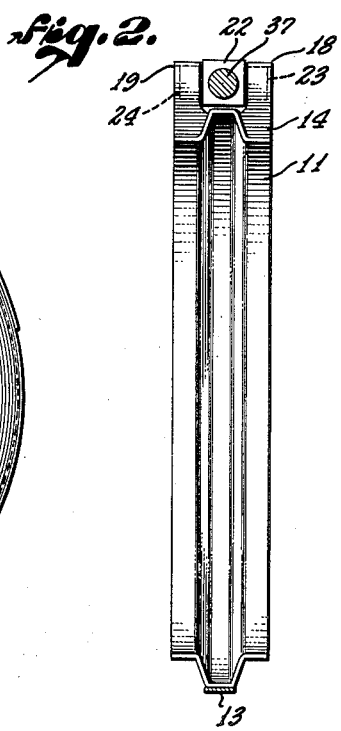
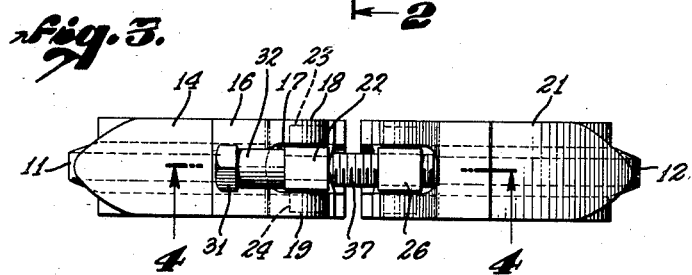
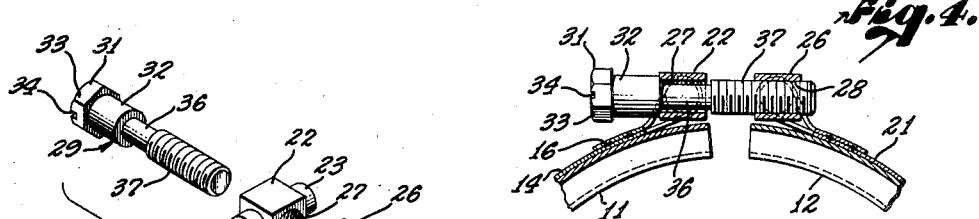
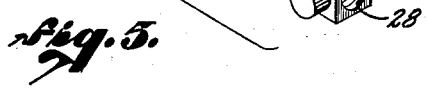
VERNON W. BALZER,
INVENTOR.
HUEBNER, BEEHLER,
WORREL & HERZIG,
ATTORNEYS.
BY Warren T. Jessup Patented Sept. 7, 1954

2,688,170

UNITED STATES PATENT OFFICE 2,688,170

STRAP CLAMP

Vernon W. Balzer, Van Nuys, Calif., assignor to Hallett Manufacturing Company, Inglewood, Calif., a corporation of California Application March 31, 1951, Serial No. 218,619

2 Claims. (Cl. 24—68)

1

This invention relates to a strap clamp and has particular reference to the means for holding the open ends of the clamp together.

The primary object of this invention is to provide an improved and simplified construction for securing together the juxtaposed open ends of a strap clamp.

A further object of this invention is to provide a simplified strap clamp designed for low cost and efficient mass production.

It is another object of this invention to provide a strap clamp in which all of the elements are secured together in such a fashion that they do not come apart each time the strap clamp is removed from the object about which it is clamped.

In securing a cap over the housing of an electrical accessory of an internal combustion engine, it is often convenient to use a strap clamp having a recessed, or V-shaped, cross-section engaging the rim of the cap and a corresponding rim on the housing. It is a further object of this invention to provide an improved strap clamp of such a type, an example of which is illustrated in my copending application S. N. 232,223, filed June 18, 1951, now Patent Number 2,666,092.

In accordance with the foregoing objects and with other objects apparent hereinafter, a preferred species of the instant invention will now be described with reference to the accompanying drawing wherein:

Fig. 1 is a face view of the strap clamp.

Fig. 2 is a sectional view taken on line 2—2 of Fig. 1.

Fig. 3 is a top view.

Fig. 4 is a fragmentary cross-section taken on line 4—4 of Fig. 3.

Fig. 5 is an exploded view showing the clamping bolt and clamping washers or nuts.

Referring to the drawing, the strap clamp is shown comprised of two identical, semicircular segments 11 and 12, secured together at the bottom by a flat band 13 welded to the two segments 11 and 12. The segments 11 and 12 are U or V shaped in cross-section, as seen in Fig. 2, in order that the clamp may be used to secure a cap on a housing by encircling and holding together the juxtaposed rims of the cap and housing.

On the top surface of each segment, for example the segment 11, is bonded a flat metal band 14 doubled back and bonded to itself, as shown at 16, to form a loop at the end of the segment 11. A slot 17 in the metal strip 14 serves to form, of the loop, a pair of transverse opposed bearings 18 and 19.

2

A metal strip 21 identical to the strip 14 is secured to the segment 12 and slotted and looped in the same way. The two segments 11 and 12 are thus substantially identical, thereby simplifying and economizing production.

In the slot 17 forming the space between the bearings 18 and 19 is disposed a washer member or nut 22 having a cubical body and a pair of trunnions 23 and 24 extending from the sides thereof and disposed in the bearings 18 and 19, respectively. The bearings of the segment 12 have a substantially identical washer member or nut 26 held therein. In fabrication, the washer members are disposed in position before the loops are folded back on the bands and bonded thereto.

Transversely through the washer member 22 is extended a threaded bore 27. A similar bore 28 extends through the washer member 26, likewise transverse of the trunnion axis. Since the washer members are pivotally mounted in their bearings by means of their trunnions, the bores 27 and 28 may be readily aligned for the passage therethrough of a securing bolt 29. The bolt 29 passes through the bore 27 and threadedly engages the bore 28, with the head 31 of the bolt abutting the flat face of the washer member 22. Thus, as the bolt 29 is screwed up, the juxtaposed or facing ends of the segments 11 and 12 are drawn toward each other. The head 31 of the bolt 29 is made somewhat elongate and the inner portion thereof is slightly undercut and formed cylindrical as shown at 32. This is done in order that the hexagonal wrench engaging portion 33 of the head 31 may be spaced some distance outwardly of the arcuate segment 14, thereby simplifying access by a wrench. A kerf 34 is formed transversely in the bolt head 31 to accommodate a screwdriver if desired.

Since the two washer members 22 and 26 are identical, being formed as nuts with threaded bores, it is necessary to annularly relieve the bolt 29 adjacent the head 31 as shown at 36. This is required in order that the bolt 29, having been threaded through the bore 27, may be freed of its threaded engagement so that continued rotation of the bolt 29 will not change the longitudinal position of washer member 22 with respect to the bolt, but will draw in the nut or washer member 26. In this operation the inner face of the cylindrical portion 32 of the head 31 abuts the face of the washer or nut 22. The longitudinal extent of the relieved portion 36 is made slightly greater than the length of the bore 27, as best seen in Fig. 1, in order that the relieved portion may be disposed freely in the bore 27 so that the threads 37 of the bolt are free of the threaded bore 27.

By thus providing the relieved bolt 29, it is possible to use identical members 22 and 26. Without the relief 36 it would be necessary to form the member 22 with a smooth bore of diameter somewhat larger than the threaded bore 28 so that the member 22 would function simply as a washer. The instant construction has the further advantage of retaining the clamping bolt 29 mounted to the strap clamp assembly even when the latter is removed from the clamped object. In order to remove the bolt 29 completely from the assembly it is necessary to unscrew it, not only from the nut 26 (which opens the clamp so that it may be removed from the clamped object), but also unscrew it through the threaded bore 27 of the nut 22.

From the above description it will be seen that there has been described a strap clamp assembly wherein both ends of the strap are fabricated of identical parts with attendant production economies. It will also be seen that the instant invention provides a simple yet effective means for retaining the clamping bolt in operative relation to the loosened strap clamp whereby danger of accidental separation of the bolt from the remainder of the clamp is virtually precluded.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus, and articles.

What is claimed is:

1. Clamp means comprising a strap having at each end a pair of transverse opposed bearings with a space therebetween, a pair of substantially identical washer members, one disposed in each of said spaces, each washer member having a pair of trunnions extending into the opposed bearings so as to journal the washer member in the bearing, said strap being bent with the ends thereof brought into juxtaposition, said washer members having aligned threaded bores passing transversely therethrough and adapted to receive a clamping bolt, and a clamping bolt having a relieved portion adjacent its head disposed in one of said bores with the head of the bolt abutted against the corresponding washer member, the end of said bolt being threadedly engaged by the other washer member.

2. Clamping means comprising a strap, each end of said strap having a pair of transverse opposed bearings with a nut-receiving space therebetween, a pair of substantially identical nuts, each having a pair of oppositely extending trunnions, one nut being mounted in each of the two ends of said strap with its trunnions extending into and being carried by the bearings thereon, each of said nuts having a threaded bore therethrough, said bores being alignable when said strap is bent into an annular shape, and a bolt having a smooth, relieved circumference adjacent its head disposed in the bore in one of said nuts, the end of the bolt being threaded into the other of said nuts, whereby upon screwing in of said bolt the ends of said strap are brought toward each other.

References Cited in the file of this patent

UNITED STATES PATENTS

| Number | Name | Date |
| --- | --- | --- |
| 37,767 | Perley | Feb. 24, 1863 |
| 485,484 | Arnold | Nov. 1, 1892 |
| 2,208,859 | Scott | July 23, 1940 |
| 2,272,178 | McDowell et al. | Feb. 10, 1942 |
| 2,326,282 | Bierenfeld | Aug. 10, 1943 |
| 2,403,449 | Meyer et al. | July 9, 1946 |

FOREIGN PATENTS

| Number | Country | Date |
| --- | --- | --- |
| 55,786 | Switzerland | of 1912 |
| 117,185 | Great Britain | July 11, 1918 |
| 726,300 | Germany | Oct. 10, 1942 |